United States Patent [19]
Chatterji

[11] Patent Number: 5,664,195
[45] Date of Patent: Sep. 2, 1997

[54] METHOD AND APPARATUS FOR DYNAMIC INSTALLATION OF A DRIVER ON A COMPUTER SYSTEM

[75] Inventor: Sanjoy Chatterji, Waltham, Mass.

[73] Assignee: Sequoia Systems, Inc., Marlborough, Mass.

[21] Appl. No.: 603,380

[22] Filed: Feb. 20, 1996

Related U.S. Application Data

[63] Continuation of Ser. No. 44,347, Apr. 7, 1993, abandoned.

[51] Int. Cl.$^6$ .................................................. G06F 9/44
[52] U.S. Cl. .................................... 395/712; 395/681
[58] Field of Search ................................ 395/681, 701, 395/712, 680

[56] References Cited

U.S. PATENT DOCUMENTS

| | | | |
|---|---|---|---|
| 3,736,566 | 5/1973 | Anderson et al. | 340/172.5 |
| 4,044,337 | 8/1977 | Hicks et al. | 364/200 |
| 4,228,496 | 10/1980 | Katzman et al. | 364/200 |
| 4,484,273 | 11/1984 | Stiffler et al. | 364/200 |
| 4,533,997 | 8/1985 | Furgerson | 364/200 |
| 4,654,819 | 3/1987 | Stiffler et al. | 364/900 |
| 4,734,855 | 3/1988 | Banâtre et al. | 364/200 |
| 4,740,969 | 4/1988 | Fremont | 371/12 |
| 4,751,639 | 6/1988 | Corcoran et al. | 364/200 |
| 4,819,154 | 4/1989 | Stiffler et al. | 364/200 |
| 4,819,232 | 4/1989 | Krings | 371/9 |
| 4,924,466 | 5/1990 | Gregor et al. | 371/12 |
| 4,941,087 | 7/1990 | Kap | 364/200 |
| 4,954,941 | 9/1990 | Redman | 364/200 |
| 4,958,273 | 9/1990 | Anderson et al. | 364/200 |
| 4,964,126 | 10/1990 | Musicus et al. | 371/36 |
| 4,974,151 | 11/1990 | Advani et al. | 395/700 |
| 5,142,680 | 8/1992 | Ottman et al. | 395/700 |
| 5,157,663 | 10/1992 | Major et al. | 371/9.1 |
| 5,170,472 | 12/1992 | Cwiakala et al. | 395/275 |
| 5,175,828 | 12/1992 | Hall et al. | 395/375 |
| 5,179,666 | 1/1993 | Rimmer et al. | 395/275 |
| 5,214,652 | 5/1993 | Sutton | 371/9.1 |
| 5,235,700 | 8/1993 | Alaiwan et al. | 371/9.1 |
| 5,257,368 | 10/1993 | Benson et al. | 395/600 |
| 5,265,252 | 11/1993 | Rawson, III et al. | 395/681 |
| 5,269,017 | 12/1993 | Hayden et al. | 395/575 |
| 5,303,392 | 4/1994 | Carney et al. | 395/775 |

(List continued on next page.)

OTHER PUBLICATIONS

Egan, J.I., Teixeira, T.J., *Writing A Unix Device Driver*, John Wiley & Sons, 1988, pp. 62–63.

Pajari, G., *Writing Unix Device Drivers*, Wesley Pub. Co. Inc. 1991, pp. 275–283.

Segal, Mark E., "On–the–fly Program Modification: Systems For Dynamic Updating," IEEE Software, vol. 10, No. 2, Mar. 1993.

Authors: Mark E. Segal and Ophir Frieder—Title: On–The–Fly Program Modification: Systems For Dynamic Updating—Mar. 1993—IEEE Software, vol. 10, No. 2—pp. 53–65.

*Primary Examiner*—Kevin A. Kriess
*Attorney, Agent, or Firm*—Wolf, Greenfield & Sacks, P.C.

[57] ABSTRACT

A method is provided for dynamic installation of a driver on a computer system. The computer system has a first operator processor with a first memory and an operating system, a second processor with a second memory and operating code configurable to accept a driver, and a data channel supporting communication between the first processor and the second processor, the first processor sending requests to the second processor for processing. The method includes the steps of: (a) storing a driver in the first memory; (b) uploading a copy of the operating code to the first memory from the second memory; (c) testing the driver for compatibility with a current configuration of the operating code; (d) linking the driver with the copy of the operating code to produce a reinforced operating code in the first memory while the second processor is executing the operating codel and (e) downloading, by the first processor, a copy of the reconfigured operating code to the second memory to switch the second processor from executing the operating code to executing the copy of the reconfigured operating code.

22 Claims, 4 Drawing Sheets

U.S. PATENT DOCUMENTS

| | | | |
|---|---|---|---|
| 5,313,647 | 5/1994 | Kaufman et al. | 395/700 |
| 5,317,752 | 5/1994 | Sewett et al. | 395/750 |
| 5,319,751 | 6/1994 | Garney | 395/200 |
| 5,325,517 | 6/1994 | Baker et al. | 395/575 |
| 5,325,519 | 6/1994 | Long et al. | 395/575 |
| 5,329,619 | 7/1994 | Page et al. | 395/200 |
| 5,337,912 | 8/1994 | Baker et al. | 395/275 |
| 5,355,498 | 10/1994 | Provino et al. | 395/700 |
| 5,386,567 | 1/1995 | Lien et al. | 395/700 |
| 5,430,845 | 7/1995 | Rimmer et al. | 395/681 |
| 5,459,867 | 10/1995 | Adams et al. | 395/681 |
| 5,465,364 | 11/1995 | Lathrop et al. | 395/681 |
| 5,475,836 | 12/1995 | Harris et al. | 395/681 |
| 5,581,766 | 12/1996 | Spurlock | 395/652 |

METHOD AND APPARATUS FOR DYNAMIC INSTALLATION OF A DRIVER ON A COMPUTER SYSTEM

This application is a continuation of application Ser. No. 08/044,347, filed Apr. 7, 1993, now abandoned.

FIELD OF THE INVENTION

This invention is related to the development and testing of device drivers and the installation of such drivers into computer systems, particularly fault-tolerant, low down-time computer systems.

BACKGROUND OF THE INVENTION

In most computer systems, when a new peripheral device (e.g., a printer, disk, tape drive, terminal or input/output device) is attached to the computer system, a device driver must be developed and then loaded into the operating system, in order to permit use of the peripheral device. Also, if a device driver is modified or replaced, a new device driver is loaded in a similar way to replace an old device driver. In typical computer systems, after a device driver is linked into an operating system, the computer must be rebooted, i.e., shut down and restarted, with the new operating system.

Shutting down and restarting a computer system is not generally desirable. In particular, in systems which are designed to be fault-tolerant such as banking systems, long down-time is not merely undesirable, it may actually cause loss of data and business. Unacceptable down-time is frequently experienced by customers when they develop and test drivers for newly acquired peripheral devices, such as new printers and new disk drives. To avoid these problems, customers often require their computer suppliers to develop and test new drivers. However, most computer suppliers, whose typical primary focus is product development, want to avoid diverting their technical resources away from their primary business goals. They do not see the development of drivers as being a cost effective contribution to their business.

Development of drivers also often requires access to the source code for the operating system. Many computer manufacturers, however, do not wish to distribute the source code of their operating systems, in order to protect proprietary information for business reasons and also to protect system integrity and security of systems in use.

SUMMARY OF THE INVENTION

The present invention provides a method and apparatus for dynamic installation of a driver on a computer system.

A preferred embodiment of the present invention includes a first processor with a first memory having a first operating system, and a second processor with a second memory, the second memory containing boot code and operating code, the operating code being configurable to accept a driver. A data channel provides communication between the first processor and the second processor. The first processor accepts the driver from the user and uploads a copy of the operating code from the second processor. The first processor tests the driver for conformance with pre-defined design rules and for compatibility with the configuration of the copy of the operating code. If there are no problems, the first processor then links the driver to the copy of the operating code to produce a reconfigured second operating system in the first memory. A quiesce command then places the second processor in a condition to accept the reconfigured operating code, and loads a copy of the reconfigured operating code into the second memory. The second processor, on receipt of a command from the first processor, switches control of the second processor from its boot code to the reconfigured operating code in second memory, the second processor thereby placing itself in condition to resume normal operation.

During this entire process, users continue to submit requests to the system. These requests are enqueued, i.e. buffered by the first operating system and later submitted to the second operating system for processing. These requests are neither rejected nor lost during the entire installation process.

DESCRIPTION OF THE SPECIFIC EMBODIMENTS

Figure 1:
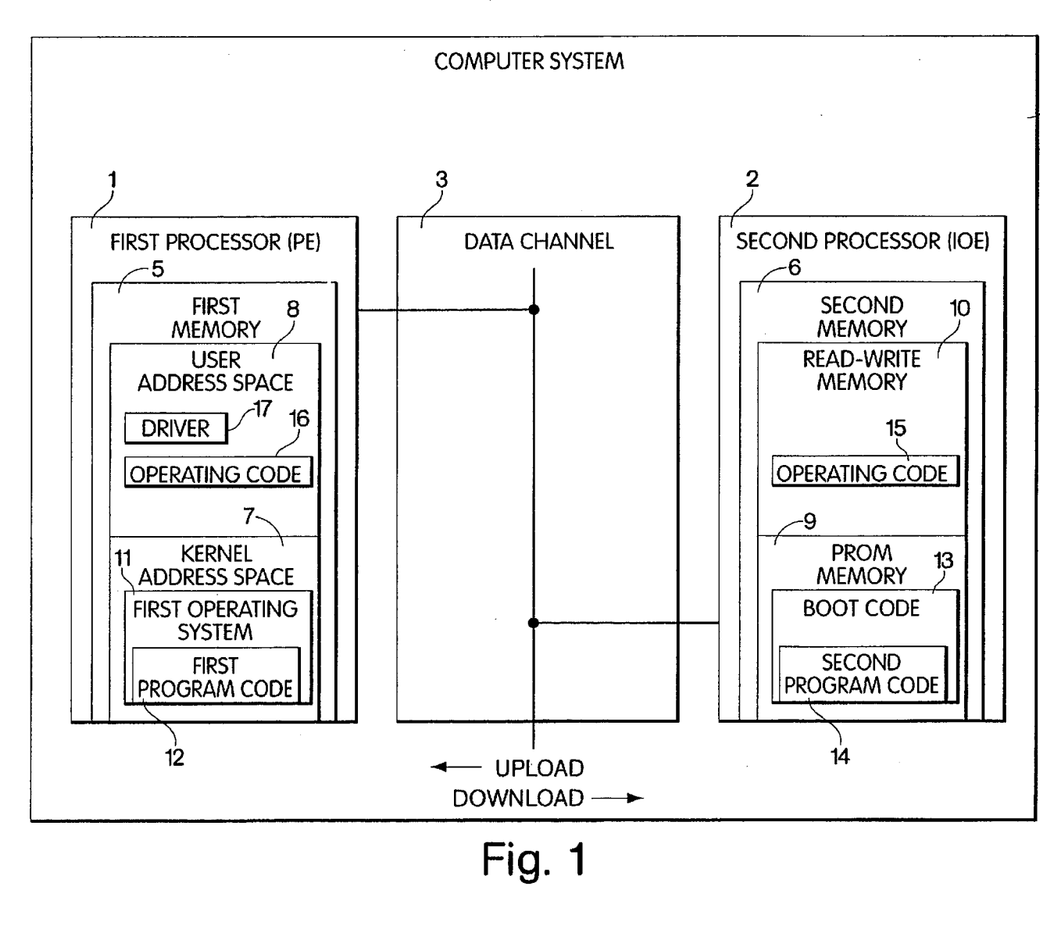
FIG. 1 is a block diagram of a multi-processor system suitable for practicing the invention.

FIG. 1 is a block diagram of a computer system 4 suitable for practicing the invention. The system includes a first processor 1, a second processor 2 and a data channel 3 providing communication between the two processors. First processor 1 includes a first memory 5 having a kernel address space 7 and a user address space 8. Second processor 2 includes a second memory 6 having a programmable read-only memory (PROM) portion 9 and a read-write memory 10.

Kernel address space 7 contains a first operating system 11 which includes a first program code 12. The first program code includes two queues, an incoming-request queue and a sent-but-not-completed queue. A second operating system resides in second memory 10. The second operating system includes boot code 13 including second program code 14, in PROM memory 9, and a current version of operating code in read-write memory 10. Read-write 10 memory contains a current version of the operating code 15. User address space 8 contains a scratch copy 16 of the operating code which is initially a copy of the current version of the operating code and is reconfigured to become operating code with a different driver set.

Figure 2A:
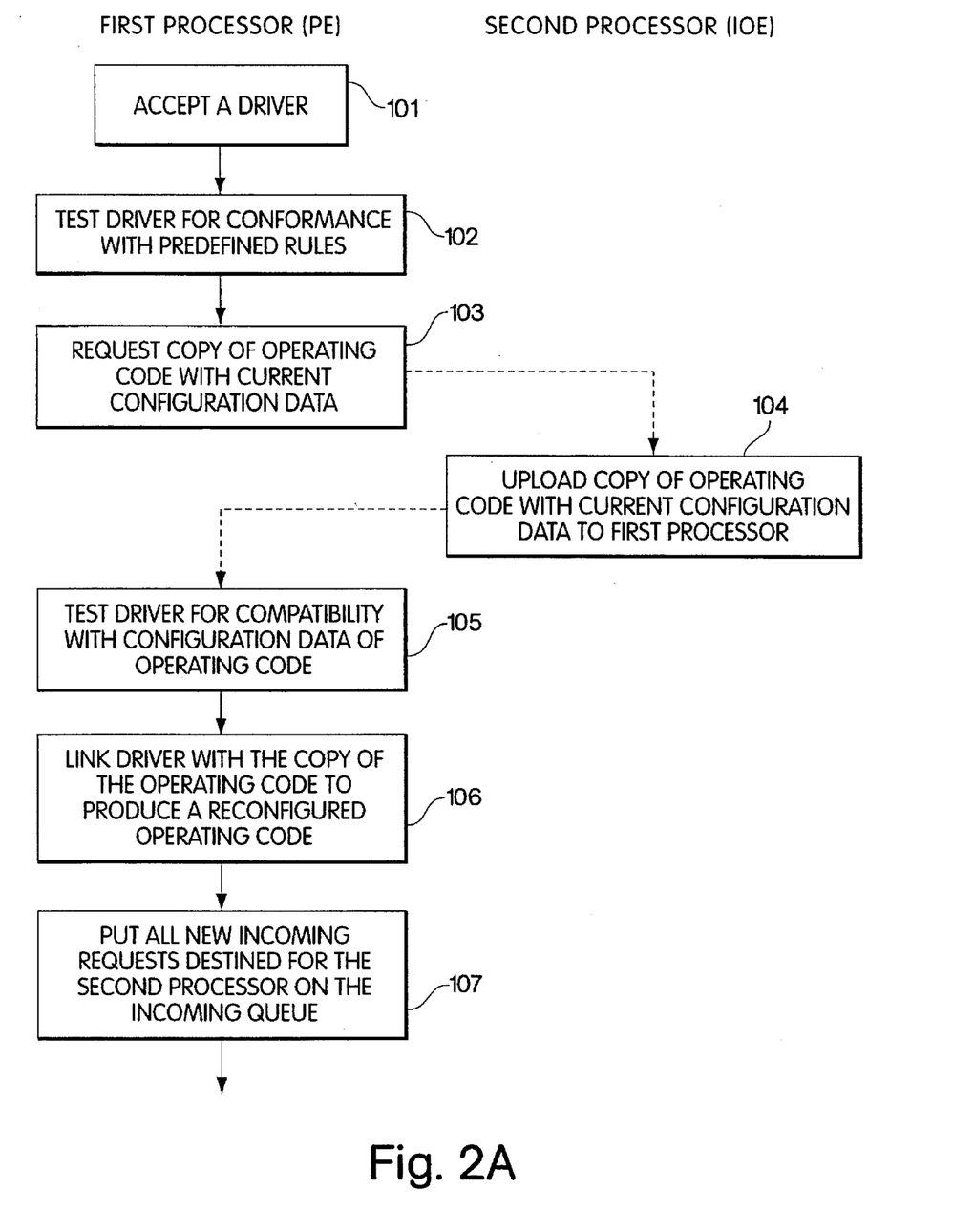
FIGS. 2A and 2B provide a flow diagram describing how the two processors in the system of FIG. 1 interact.
Figure 2B:
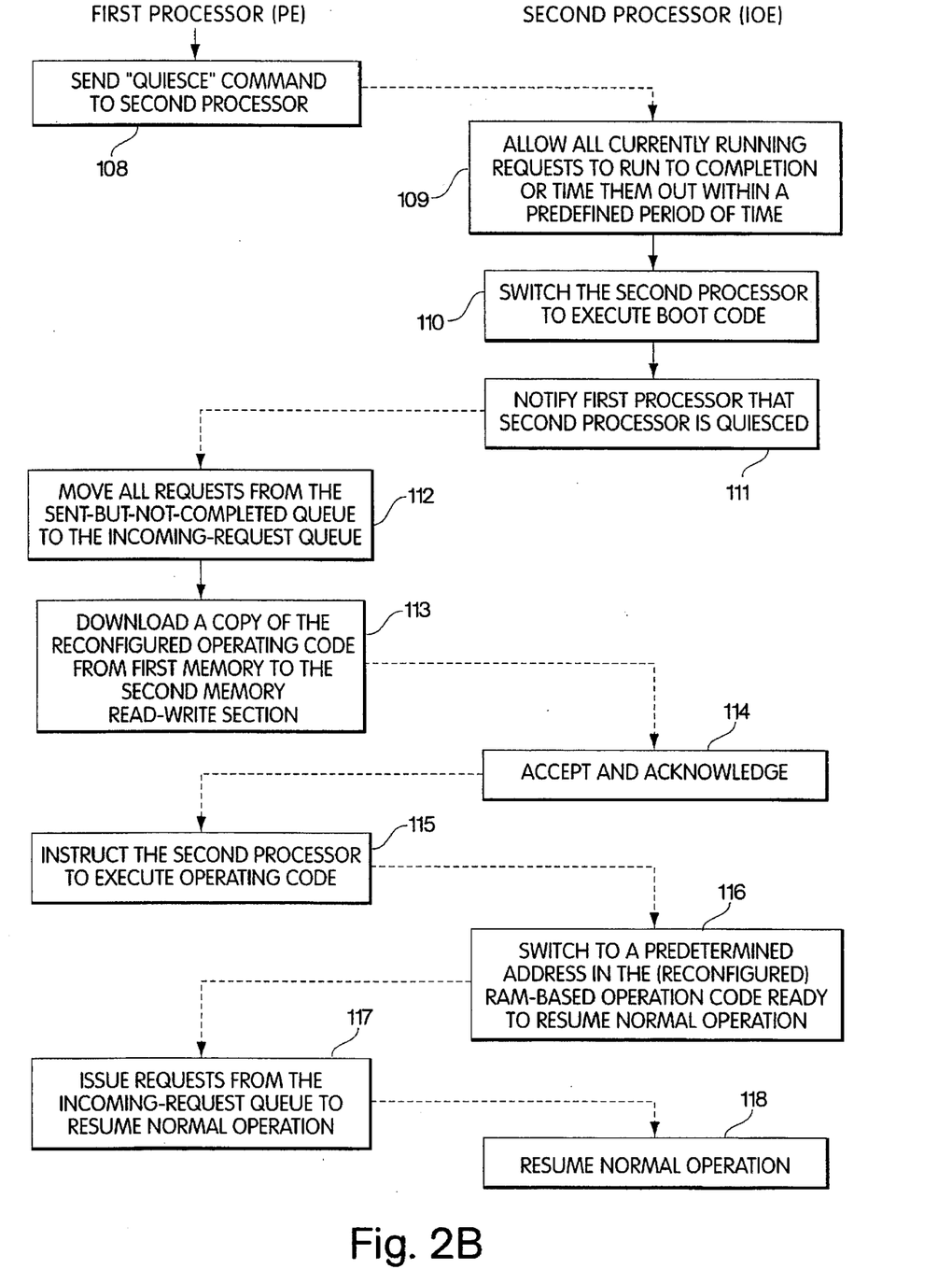

Although only two processors are shown in FIG. 1 and referred to in FIG. 2, the invention is most beneficially used in a multi-processor fault-tolerant computer system for which continuous reliable operation and extremely low down-time are important operational requirements. Such a system is described in detail in U.S. Pat. No. 4,484,273 which is hereby incorporated by reference. Such systems are sold by Sequoia Systems, Inc., 400 Nickerson Road, Marlboro, Mass. 01752. These systems have multiple first processors (multiprocessing processing elements or PE's) and multiple second processors (uniprocessing input/output elements or IOE's). In these systems there is a single, shared first operating system and there are multiple second operating systems.

FIG. 2 shows the sequence of actions for the embodiment of FIG. 1 performed by the two processors including data transfer and command processes.

First processor 1 executes program code in the first operating system 11 to perform the steps listed under "FIRST PROCESSOR" in FIGS. 2A and 2B. Second processor 2 executes boot code 14 to perform the steps listed under "SECOND PROCESSOR" in FIGS. 2A and 2B. Returning now to FIG. 1, a scratch copy 16 of the operating code is located in user address space and the new driver is linked with the scratch copy 16 to create a reconfigured operating code in user address space. The process of dynamic installation in the embodiment of FIG. 1 proceeds as follows:

The user copies a driver into user memory of the first processor and initiates the dynamic installation process (step 101). The first processor, executing code in the first operating system, tests the driver for conformance with predefined rules (step 102). In the UNIX-based fault-tolerant system of the type described above in which the driver to be installed is written in the C language, this test of the driver is performed using the conventional UNIX "lint" command. Localized aspects of the driver are tested using pass 1 of the "lint" program checker. The program checker issues errors and warnings to the extent it detects potential problems. If the driver passes this test, the first processor then issues a request to the second processor to upload a copy of the operating code including the current configuration data (step 103). The second processor uploads a copy of the operating code with its current configuration data into the user address space of the memory of the first processor (step 104). The first processor, now having a copy of the driver and the operating code in its memory, tests the driver for compatibility with configuration data in the operating code (step 105). In a UNIX-based fault-tolerant system of the type described above, global aspects of the driver are tested using pass 2 of the "lint" program checker. The program checker issues errors and warnings to the extent it detects potential problems. If there are no problems, the first processor links the driver with a copy of the operating code to produce a reconfigured operating code in user address space (step 106). In a UNIX-based fault-tolerant system of the type described above, linking is performed using the (ld) command of a conventional UNIX link editor for object files, a technology well known in the art. Having linked the driver, the first processor now puts all new incoming requests destined for the second processor on the incoming queue (step 107). Then the first processor sends a "quiesce" command to the second processor (step 108). The first processor in a UNIX-based fault-tolerant system of the type described above keeps track of requests sent to a given second processor and requests completed by a given second processor. Requests sent but not completed are stored in a "sent-but-not-completed queue" for retransmission according to conventional fault recovery procedures. This same sent-but-not-completed queue is used in a preferred embodiment of present invention, as noted in step 112 below, to ensure that no requests are lost in the installation process. The second processor, which is now no longer receiving new incoming requests, allows all currently running requests to run to completion or to time out within a predefined period of time (step 109). After the predetermined period of time has elapsed, the second processor switches to a predefined address in boot code and begins to execute boot code (step 110) and then notifies the first processor that the second processor is quiesced (step 111). On receipt of notification that the second processor is quiesced, the first processor moves all remaining uncompleted requests from the sent-but-not-completed queue to the incoming-request queue (step 112). Then the first processor downloads a copy of the reconfigured operating code to the second memory (step 113). The second processor accepts the reconfigured operating code and passes an acknowledgment to the first processor (step 114). The first processor, on receipt of the acknowledgment, instructs the second processor to switch to a predefined address in the (now reconfigured) operating code so as to begin execution of operating code (step 115). The second processor having switched to the predetermined address in the operating code is now ready to resume normal operation (step 116). The first processor on receipt of an acknowledgment to this effect issues requests from the incoming-request queue to the second processor (step 117) to cause the second processor to resume normal operation (step 118).

It can be seen from FIGS. 2A and 2B that most of the time-consuming steps involved in installing a new driver are performed by the first processor (in a multi-tasking mode) before the first processor quiesces the second processor. The most time-consuming steps are: test driver for conformance with predefined rules, test driver for compatibility with the operating code, and link the driver to the copy of the operating code to produce a reconfigured operating code. All of these steps are performed prior to temporarily suspending the request processing capability of the second processor.

The period during which installation affects the performance of the second processor may be divided into two phases: phase A, corresponding to steps 101 through 108, and phase B, corresponding to steps 109 through 116. During phase A each incoming command is accepted by the first processor and put onto the incoming-request queue for later execution. These requests continue to be sent to the second processor. During phase B the second processor moves is effectively disabled. After phase B the first processor moves the contents of the sent-but-not-completed queue to the incoming-request queue. After phase B the first processor initiates resumption of normal processing by issuing all requests in the incoming-request queue to the second processor so that all delayed requests as well as new incoming requests are executed by the second processor.

The effect is to delay execution of new incoming requests during phase B. During phase B the request processing capability of the second processor is disabled but only for the very short period defined by the time taken by the second processor to notify the first processor that the second processor is quiesced, for the first processor to download the reconfigured second operating system into second memory, and for the second processor switch itself from operating on the PROM-based boot code to operating on the reconfigured RAM-based operating code. The present invention does not require the system as a whole to be shut down during the installation process, it limits the disablement of any portion of the system to the input/output processor that is to receive the new driver, and it limits the time during which this input/output processor is disabled. Temporary disablement of the second processor is limited to steps 111 through 115 shown in FIG. 2. In a large multi-processor system such as described in U.S. Pat. No. 4,484,273, temporary disablement occupies a time measured in milliseconds.

During the installation process, users continue to submit requests for the system. These requests are enqueued, i.e. buffered by the first operating system and later submitted to the second operating system for processing. These requests are neither rejected nor lost during the entire installation process.

The system is additionally capable of permitting the installation of multiple drivers in a single operation by performing steps 101 through 106 for each driver in turn before performing the quiesce step and subsequent steps.

For the system described above, linking in user address space is generally recommended because, in a multi-processor fault-tolerant system having multiprocessing first processors (also known as PE's) and uniprocessing second processors (also known as IOE's), linking capability usually already exists in the PE operating system for linking objects in user address space. This same linking capability can be re-used by the first program code of the present invention.

In a large system, having many IOE's each having a unique set of input devices and output devices, the present invention allows the operating system for every IOE may be configured for a different set of drivers. Thus, the IOE does not have to be configured to contain drivers for every supported peripheral device on the system. Accordingly, the configured operating system in a given IOE in a system including the present invention might differ from the configured operating system in every other IOE.

In a preferred embodiment of the present invention the scratch copy of the operating code within the first memory is located within user address space. However, it could be in any read-write space, either in the first processor or in the second processor. Also, the invention is not limited to multi-processor fault-tolerant systems. It may be implemented on any two computers connected by a network, for example two PC's connected by an ethernet network, with appropriate modification to the operating system. It may also be implemented on a single computer system having a single processor and an I/O address space as shown in FIG. 3, wherein the I/O address space, the user address space, and the kernel address space are held distinct by a predefined set of address ranges.

Figure 3:
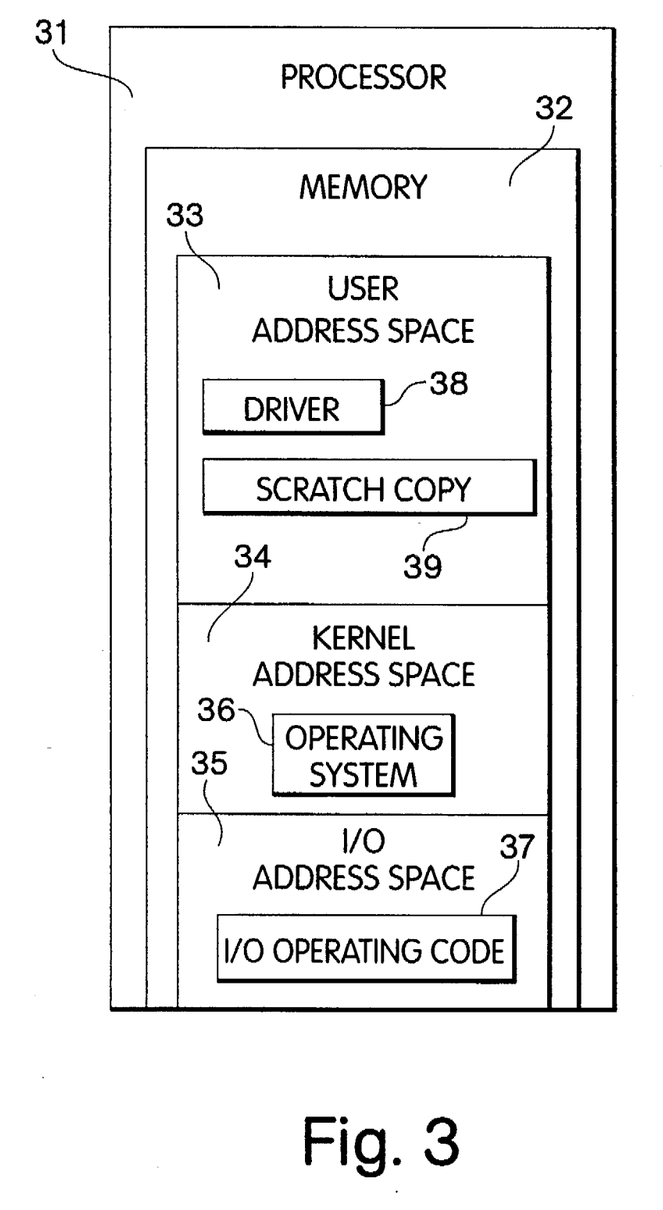
FIG. 3 is a block diagram of a single processor system suitable for practicing the present invention.

FIG. 3 shows a single processor system suitable for practicing the present invention. The system includes a processor 31 and a memory 32. The memory includes a user address portion 33, a kernel address portion 34 and an I/O address portion 35. The kernel address portion contains an operating system 36 and the I/O address portion contains I/O operating code 37. During the installation of a driver, user address space contains a copy of the driver 38 and a scratch copy 39 of I/O operating code.

It can be seen from the above that the present invention may be applied to the dynamic installation of operating code containing other modifications than driver code. Thus, operating code comprising most of the operating system may be dynamically installed, either in a multiprocessor system or in a single processor system.

The system described above enables users, or contractors they hire, to write and install new drivers themselves, without involving the computer manufacturer or supplier, and without requiring access to the operating system source code. It further provides a method for dynamic installation of a new driver that will facilitate development and testing of new drivers by the computer system manufacturer as well as by the user.

The embodiment described above is merely illustrative and is not intended to be limiting, having been presented by way of example only. Numerous other embodiments and modifications are contemplated as falling within the scope of the present invention as defined by the appended claims and equivalents thereto.

What is claimed is:

1. A method for dynamically installing a driver on a computer system, the computer system having a first processor, and a second processor, the method comprising the steps of:

(a) the first processor sending a quiesce command to the second processor, while the second processor operates in a first operating state according to a first operating code;

(b) the second processor, in response to the quiesce command, exiting the first operating state, entering a quiesced state, and sending a notify message to the first processor indicating that the second processor is in the quiesced state;

(c) the first processor, in response to the notify message, queuing a first request sent to the second processor from an external source, and sending the second processor an execute command while the second processor is in the quiesced state;

(d) the second processor, in response to the execute command, exiting the quiesced state, entering a second operating state to operate according to a second operating code having the driver, and sending an acknowledgment message to the first processor indicating that the second processor is in the second operating state;

(e) the first processor, in response to the acknowledgment message, issuing the queued first request to the second processor; and (f) the second processor executing the issued first request while operating in the second operating state according to the second operating code.

2. The method of claim 1, wherein step (c) includes a step of the first processor queuing the first request in a first queue, and wherein the method further includes a step of the first processor queuing a second request in the first queue.

3. The method of claim 2, wherein the method further comprises a step of the first processor queuing a third request in a second queue, the third request being uncompleted by the second processor before entering the quiesced state.

4. The method of claim 3, wherein step (c) further includes a step of combining the request queued in the first queue with the second request queued in the second queue to form a third queue such that the first processor issues requests queued in the first and second queues from the third queue.

5. The method of claim 4, wherein step (e) includes a step of the first processor issuing the first request from the third queue to the second processor.

6. The method of claim 1, wherein the first processor is associated with a first memory, wherein the second processor is associated with a second memory, and wherein the method further comprises a step of:

the first processor, in response to the notify message, transferring the second operating code from the first memory to the second memory for the second processor to execute.

7. The method of claim 1, wherein step (b) further includes a step of the second processor waiting for a predetermined amount of time before exiting the first operating state and entering the quiesced state.

8. A method for dynamically replacing first operating code with second operating code on a computer system, the computer system having a first processor and a second processor the method comprising the steps of:

(a) the first processor sending a quiesce command to the second processor while the second processor operates in a first operating state according to the first operating code;

(b) the second processor, in response to the quiesce command, exiting the first operating state, entering a quiesced state, and sending a notify message to the first processor indicating that the second processor is in the quiesced state;

(c) the first processor, in response to the notify message, queuing a first request sent to the second processor from an external source, and sending the second processor an execute command, while the second processor is in the quiesced state;

(d) the second processor, in response to the execute command, exiting the quiesced state, entering a second operating state to operate according to the second operating code, and sending an acknowledgment message to the first processor indicating that the second processor is in the second operating state;

(e) the first processor, in response to the acknowledgment message, issuing the queued first request to the second processor; and (f) the second processor executing the issued first request while operating in the second operating state according to the second operating code.

9. The method of claim 8, and wherein step (c) includes a step of the first processor queuing the first request in a first queue, and wherein the method further includes a step of the first processor queuing a second request in the first queue.

10. The method of claim 9, wherein the method further comprises a step of the first processor queuing a third request in a second queue, the third request being uncompleted by the second processor before entering the quiesced state.

11. The method of claim 10, wherein step (c) further includes a step of combining the first request queued in the first queue with the second request queued in the second queue to form a third queue such that the first processor issues requests queued in the first and second queues from the third queue.

12. The method of claim 11, wherein step (e) includes a step of the first processor issuing the first request and the second request from the third queue to the second processor.

13. The method of claim 8, wherein the first processor is associated with a first memory, wherein the second processor is associated with a second memory, and wherein the method further comprises a step of:

the first processor, in response to the notify message, transferring the second operating code from the first memory to the second memory for the second processor to execute.

14. The method of claim 8, wherein step (b) further includes a step of the second processor waiting for a predetermined amount of time before exiting the first operating state and entering the quiesced state.

15. A computer system for dynamically installing a driver, comprising:

a first processor including a first memory;

a second processor including a second memory; and a data channel supporting communication between the first processor and the second processor;

wherein the first processor further includes means for sending a quiesce command to the second processor through the data channel, while the second processor operates in a first operating state according to a first operating code stored in the second memory; means for queuing, in response to a notify message, a first request sent to the second processor from an external source, and sending the second processor an execute command through the data channel, while the second processor is in a quiesced state; and means for issuing, in response to an acknowledgment message, the first request to the second processor through the data channel; and wherein the second processor further includes means for exiting, in response to the quiesce command, the first operating state, entering a quiesced state, and sending the notify message to the first processor indicating that the second processor is in the quiesced state; means for exiting, in response to the execute command, the quiesced state, entering a second operating state to operate according to a second operating code transferred to the second memory from the first memory through the data channel, and sending the acknowledgment message to the first processor indicating that the second processor is in the second operating state; and means for executing the issued first request while operating in the second operating state according to the second operating code.

16. The computer system of claim 15, wherein the second processor further includes means for waiting for a predetermined amount of time before exiting the first operating state and entering the quiesced state.

17. A method for dynamically replacing first operating code with second operating code on a computer system, the computer system having a first processor and a second processor, the method comprising the steps of:

(a) the second processor, while operating in an operating state according to the first operating code, receiving a first request, executing the first request, and receiving a quiesce command from the first processor;

(b) the second processor, in response to the received quiesce command and before the first request is completely executed, exiting the operating state, and entering a quiesced state;

(c) the first processor queuing the first request in a first queue before the first request is completely executed by the second processor;

(d) the first processor, while the second processor is in the quiesced state, transferring the second operating code from the first memory to the second memory, and sending a resume command to the second processor;

(e) the second processor, in response to the resume command sent from the first processor, exiting the quiesced state and entering the operating state to operate according to the second operating code;

(f) the first processor, after the second operating code is transferred to the second memory, issuing the queued first request to the second processor; and (g) the second processor, while operating in the operating state according to the second operating code, receiving the first request from the first processor, and executing the first request.

18. The method of claim 17, further comprising a step of:

the first processor, while the second processor is in the quiesced state, queuing a second request in a second queue.

19. The method of claim 18, further comprising a step of:

the first processor combining the first request queued in the first queue the second request queued in the second queue together in one queue such that the first processor issues requests queued in the first and second queues from the one queue.

20. A method for installing a driver on a computer system, the computer system including a first processor coupled to a first memory, and a second processor coupled to a second memory, the method comprising the steps of:

(a) the second processor, while operating in an operating state according to original operating code, receiving a first request, executing the first request, and receiving a quiesce command from the first processor;

(b) the second processor, in response to the received quiesce command and before the first request is completely executed, exiting the operating state, and entering a quiesced state;

(c) the first processor queuing the first request in a first queue before the first request is completely executed by the second processor;

(d) the first processor, while the second processor is in the quiesced state, transferring new operating code including the driver from the first memory to the second memory, and sending a resume command to the second processor;

(e) the second processor, in response to the resume command sent from the first processor, exiting the quiesced state and entering the operating state to operate according to the new operating code;

(f) the first processor, after the new operating code is transferred to the second memory, issuing the queued first request to the second processor; and (g) the second processor, while operating in the operating state according to the new operating code, receiving the first request from the first processor, and executing the first request.

21. The method of claim 20, further comprising a step of:

the first processor, while the second processor is in the quiesced state, queuing a second request in a second queue.

22. The method of claim 21, further comprising a step of:

the first processor combining the first request queued in the first queue the second request queued in the second queue together in one queue such that the first processor issues requests queued in the first and second queues from the one queue.

* * * * *